United States Patent
Davis (10) Patent No.: US 8,840,195 B1
(45) Date of Patent: Sep. 23, 2014

(54) WHEEL SYSTEMS

(75) Inventor: Lyvon J. Davis, Beverly Hills, CA (US)

(73) Assignee: Texan Wire Wheels, LLC, Houston, TX (US)

( * ) Notice: Subject to any disclaimer, the term of this patent is extended or adjusted under 35 U.S.C. 154(b) by 0 days.

(21) Appl. No.: 11/841,653

(22) Filed: Aug. 20, 2007

Related U.S. Application Data (60) Provisional application No. 60/823,078, filed on Aug. 21, 2006, provisional application No. 60/865,116, filed on Nov. 9, 2006.

(51) Int. Cl.
*B60B 1/14* (2006.01)

(52) U.S. Cl.
USPC ............... 301/77; 301/74; 301/78; 301/8

(58) Field of Classification Search
USPC ............ 301/63.107, 63.108, 73, 74, 77, 78, 301/95.107, 95.108, 54, 55, 58, 59, 62, 8, 301/80, 83, 84; 29/894.34, 894.341, 29/894.343
See application file for complete search history.

(56) References Cited

U.S. PATENT DOCUMENTS

| | | | | |
|---|---|---|---|---|
| 2,734,778 A * | 2/1956 | Cook | ........... | 301/8 |
| 4,181,364 A * | 1/1980 | Reppert | ........... | 301/8 |
| 4,226,479 A | 10/1980 | Weld | | |
| 4,275,931 A * | 6/1981 | Reppert | ........... | 301/35.57 |
| 4,294,393 A | 10/1981 | Weld | | |
| 4,339,859 A | 7/1982 | Weld | | |
| 4,425,004 A * | 1/1984 | Carmichael et al. | ........... | 301/8 |

* cited by examiner

*Primary Examiner* — Kip T Kotter
(74) *Attorney, Agent, or Firm* — Gordon G. Waggett, P.C.

(57) ABSTRACT

A wheel system relating to improved wire-spoke wheels. More specifically, this invention relates to providing a safer vintage Cragar-style wire-spoke wheel having increased strength and decreased clacking noise when compared to the original Cragar wire-spoke wheel.

16 Claims, 7 Drawing Sheets

WHEEL SYSTEMS

CROSS-REFERENCE TO RELATED APPLICATION

The present application is related to and claims priority to prior provisional application Ser. No. 60/823,078, filed Aug. 21, 2006, entitled "Wheel Systems", and is related to and claims priority to prior provisional application Ser. No. 60/865,116, filed Nov. 9, 2006, entitled "Wheel Systems", the contents both of which are incorporated herein by reference and are not admitted to be prior art with respect to the present invention by their mention in this cross-reference section.

BACKGROUND

The present invention relates to wheel systems. More particularly, the present invention relates to providing vintage Cragar-style wire-spoke wheels having increased strength and safety when compared to the original Cragar wire-spoke wheels.

The original Cragar wire-spoke wheels have been popular for many years due to, among other things, their attractive appearance on automobiles. Historically, the hub of the original Cragar wire-spoke wheels was made of a weak, non-ferrous metal which was susceptible to cracking and breaking. In addition, the original Cragar wire-spoke wheels were poorly welded, and lacked proper spoke reinforcement to provide for safe and effective performance. Spokes would come loose from the hub of the original Cragar wire-spoke wheels causing an undesirable clacking noise. Even worse, such mechanical failure of the original Cragar wire-spoke wheels was a cause of automobile accidents. The original manufacturer was unable to resolve these inherent design problems and ultimately withdrew the widely popular original Cragar wire-spoke wheel from the market.

As a result, no vintage Cragar-style wire-spoke wheel system exists that provides increased strength and safety while additionally eliminating the clacking noise of the original Cragar wire-spoke wheels. Similarly, a strengthened version of a vintage Cragar-style wire-spoke wheel, having a rim diameter exceeding 15 inches, does not exist. Therefore, there is a need for a vintage Cragar-style wire-spoke wheel system that provides increased strength and safety, preventing the mechanical failure that historically has resulted in clacking and the risk of automobile accidents. Market demand for a safer, strengthened vintage Cragar-style wire-spoke wheel, demonstrates this need.

OBJECTS AND FEATURES OF THE INVENTION

A primary object and feature of the present invention is to provide vintage Cragar wheel systems. It is a further object and feature of the present invention to provide such a vintage Cragar wheel system that provides for safer automobiles within the community. Furthermore, it is a further object and feature of the present invention to provide such a vintage Cragar wheel system that provides improved strength. In addition, it is a further object and feature of the present invention to provide such a vintage Cragar wheel system that eliminates clacking noise. Furthermore, it is a further object and feature of the present invention to provide such a vintage Cragar wheel system that provides improved wheels for modern cars.

A further primary object and feature of the present invention is to provide such a vintage Cragar wheel system that is efficient, inexpensive, and handy. Other objects and features of this invention will become apparent with reference to the following descriptions.

SUMMARY OF THE INVENTION

In accordance with a preferred embodiment hereof, this invention provides a vintage Cragar-style wire-spoke automotive wheel system attachable to at least one automobile, comprising: at least one rim structured and arranged to receive at least one tire; at least one hub comprising at least one column-hub portion and at least one flange-hub portion; a first plurality of spokes, each comprising exactly one rim-end and exactly one column-hub end; a second plurality of spokes, each comprising exactly one rim-end and exactly one flange-hub end; wherein such at least one column-hub portion is structured and arranged to support such column-hub end of such first plurality of spokes; wherein such at least one flange-hub portion is structured and arranged to support such flange-hub end of such second plurality of spokes; wherein such at least one column-hub portion extends radially from at least one side of such at least one rim; at least one felly structured and arranged to support such rim-ends of such plurality of both such first plurality of spokes and such second plurality of spokes; wherein such at least one felly is mounted to such at least one rim and positioned substantially concentrically inward of such at least one rim; wherein such at least one column-hub portion is positioned substantially concentrically inward of such felly; wherein such at least one flange-hub portion comprises a plurality of lugholes structured and arranged to assist attachment of such at least one vintage Cragar-style wire-spoke automotive wheel to the at least one automobile; wherein such at least one flange comprises a plurality of screw-holes structured and arranged to secure such plurality of spokes to such at least one hub; wherein such column-hub portion comprises at least one column-hub retainer structured and arranged to retain such column-hub ends of such first plurality of spokes to such column-hub portion; wherein such flange-hub portion comprises at least one flange-hub retainer structured and arranged to retain such flange-hub ends of such second plurality of spokes to such flange-hub portion; wherein such column-hub retainer comprises at least one column-hub strengthener structured and arranged to strengthen the retention of such column-hub ends of such first plurality of spokes to such at least one column-hub retainer; whereby at least one safer reproduction of the at least one vintage Cragar-style wire-spoke automotive wheel, may be provided. Moreover, it provides such a system, wherein such at least one flange-hub retainer comprises at least one flange-hub strengthener structured and arranged to strengthen the retention of such flange-hub ends of such second plurality of spokes to such at least one flange-hub retainer. Additionally, it provides such a system, wherein such at least one flange-hub strengthener and such at least one column-hub strengthener comprises at least one substantially ferrous material for the construction of such flange-hub retainer and such column-hub retainer. Also, it provides such a system, wherein such flange-hub strengthener at least one thermal weld. In addition, it provides such a system wherein such column-hub strengthener comprises at least one thermal weld.

In accordance with another preferred embodiment hereof, this invention provides a vintage Cragar-style wire-spoke automotive wheel system attachable to at least one automobile, comprising: at least one rim structured and arranged to receive at least one tire; a plurality of spokes, each comprising exactly one rim-end and exactly one hub-end; at least one felly structured and arranged to support such rim-ends of such plurality of spokes; at least one hub structured and arranged to support such hub-ends of such plurality of spokes; wherein such at least one felly is positioned concentrically inwardly of and is mounted to such at least one rim; wherein such at least one hub is positioned concentrically inwardly of such felly; wherein such at least one hub comprises at least one column structured and arranged to support at least one hub-end of such plurality of spokes; wherein such at least one column extends radially from at least one side of such at least one rim; wherein such at least one hub comprises at least one flange structured and arranged to support such at least one hub-end of such plurality of spokes; wherein such at least one flange comprises a plurality of lugholes structured and arranged to attach at least one vintage Cragar-style wire-spoke automotive wheel to the at least one automobile; wherein such at least one flange comprises a plurality of screw-holes structured and arranged to secure such plurality of spokes to such at least one hub; wherein such system comprises at least one strengthener structured and arranged to strengthen the at least one vintage Cragar-style wire-spoke automotive wheel; and whereby at least one safer reproduction of the at least one vintage Cragar-style wire-spoke automotive wheel, may be provided. And, it provides such a system, wherein such at least one strengthener comprises at least one steel. Further, it provides such a system, wherein such at least one strengthener comprises approximately 7.9 cubic inches of at least one steel. Even further, it provides such a system, wherein such at least one strengthener comprises an at least greater than three sixteenths of an inch wide welding. Moreover, it provides such a system, wherein such at least one strengthener comprises at least one adhesive. Additionally, it provides such a system, wherein such at least one strengthener comprises at least one epoxy adhesive. Also, it provides such a system, wherein such at least one strengthener comprises at least one greater than three and one-quarter inch diameter column. In addition, it provides such a system, wherein such at least one strengthener comprises at least one curved surface, greater than 0.06 inches squared, between such at least one hub and such at least one hub end of such plurality of spokes. And, it provides such a system, wherein such at least one strengthener comprises at least one steel; wherein such at least one strengthener comprises an at least greater than three sixteenths of an inch wide welding; wherein such at least one strengthener comprises at least one epoxy adhesive; wherein such at least one strengthener comprises at least one greater than three and one-quarter inch diameter column; wherein such at least one strengthener comprises at least one front cap whereby the surface area of such at least one front cap in contact with at least one hub end of such plurality of spokes is at least greater than three-eighths square inches per such at least one hub end; and wherein such at least one strengthener comprises at least one seven inch wide rim.

In accordance with another preferred embodiment hereof, this invention provides a method of providing at least one vintage wire-spoke automotive wheel, which is safer than the original Cragar wire-spoke automotive wheel, to at least one end user, comprising the steps of: providing improved strength to the at least one vintage wire-spoke automotive wheel; and providing an appearance substantially similar to the original Cragar wire-spoke automotive wheel to at least one vintage wire-spoke automotive wheel.

In accordance with another preferred embodiment hereof, this invention provides a vintage Cragar-style wire-spoke automotive wheel system attachable to at least one automobile, comprising: at least one rim structured and arranged to receive at least one tire; a plurality of spokes, each comprising exactly one rim-end and exactly one hub-end; at least one felly structured and arranged to support such rim-ends of such plurality of spokes; at least one hub structured and arranged to support such hub-ends of such plurality of spokes; wherein such at least one felly is positioned concentrically inwardly of and is mounted to such at least one rim; wherein such at least one hub is positioned concentrically inwardly of such felly; wherein such at least one hub comprises at least one column structured and arranged to support at least one hub-end of such plurality of spokes; wherein such at least one column extends radially from at least one side of such at least one rim; wherein such at least one hub comprises at least one flange structured and arranged to support such at least one hub-end of such plurality of spokes; wherein such at least one flange comprises a plurality of lugholes structured and arranged to attach at least one vintage Cragar-style wire-spoke automotive wheel, to at least one automobile; wherein such at least one flange comprises a plurality of screw-holes structured and arranged to secure such plurality of spokes to such at least one hub; wherein such system comprises means for strengthening the at least one vintage Cragar-style wire-spoke automotive wheel; and whereby at least one safer reproduction of at least one vintage Cragar-style wire-spoke automotive wheel, may be provided.

DETAILED DESCRIPTION OF THE BEST MODES AND PREFERRED EMBODIMENTS OF THE INVENTION

Figure 1:
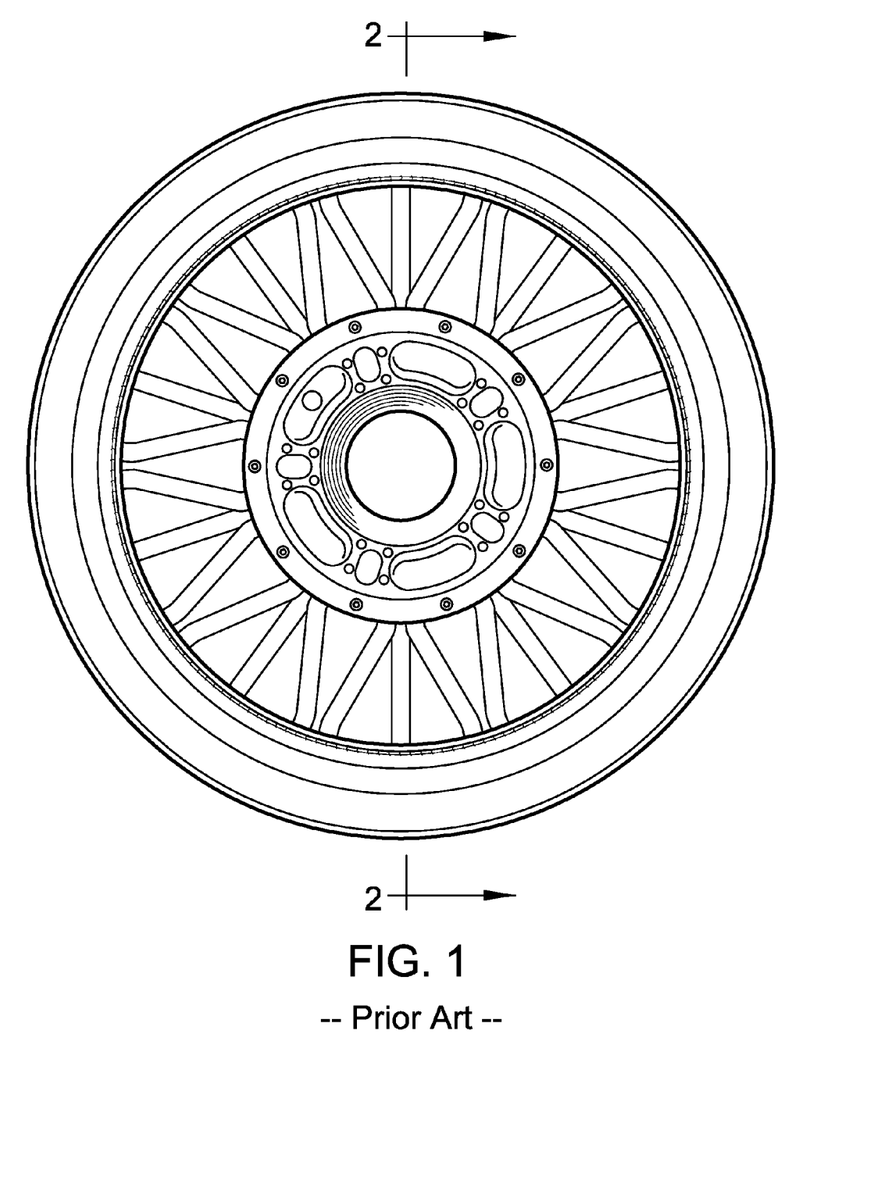
FIG. 1 shows a rear view of an original Cragar wire-spoke wheel.
Figure 2:
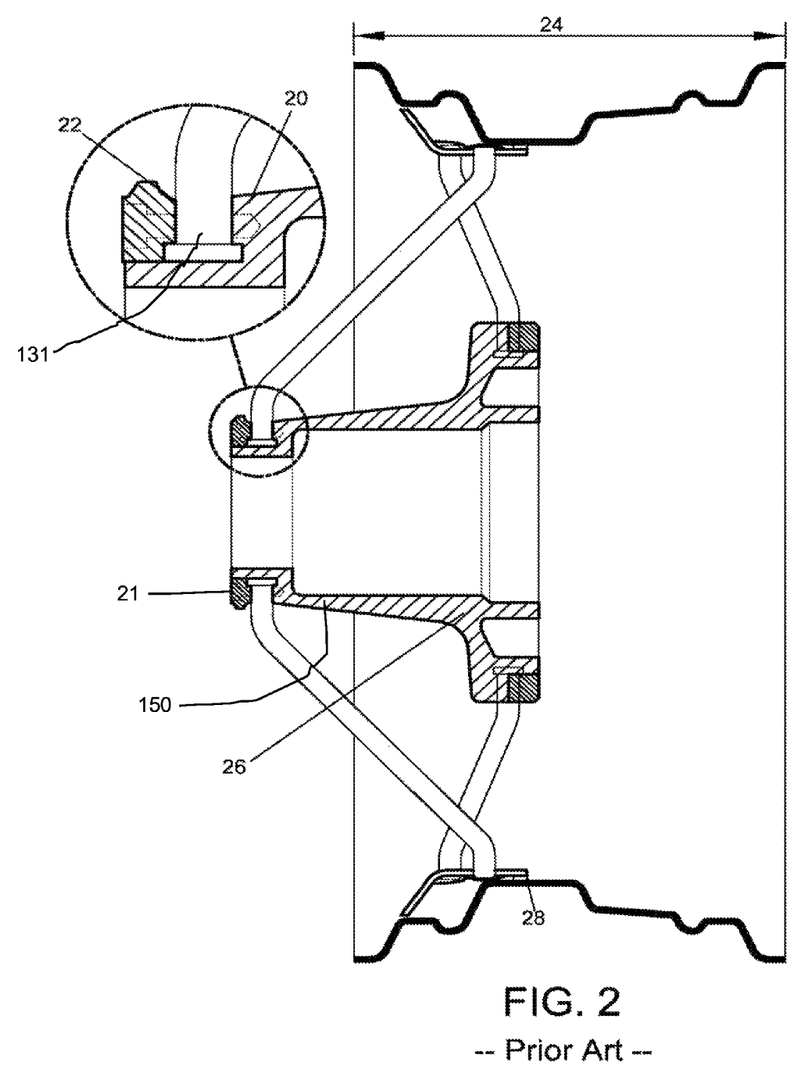
FIG. 2 shows a cross-sectional view illustrating the original Cragar wire-spoke wheel of FIG. 1.
Figure 3:
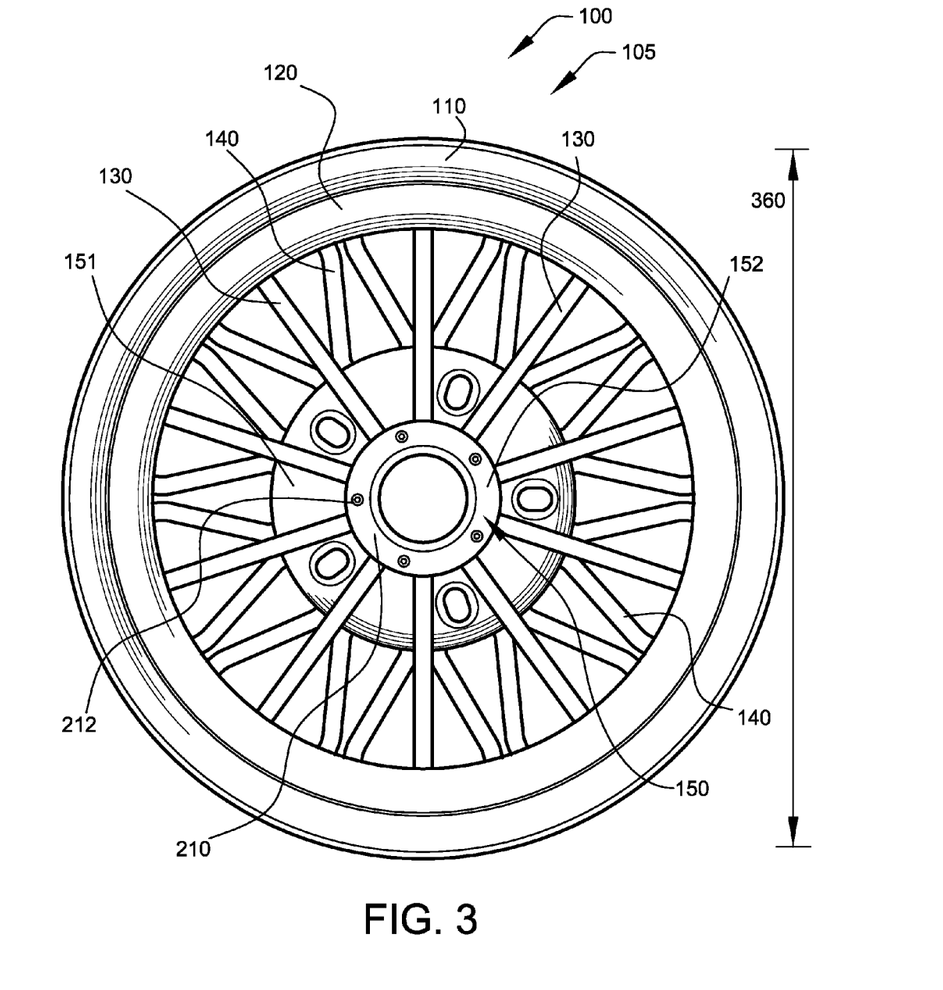
FIG. 3 shows a front view illustrating a strengthened vintage Cragar-style wire-spoke wheel, according to a preferred embodiment of the present invention.

FIG. 1 shows a rear view of an original Cragar wire-spoke wheel. FIG. 2 shows a cross-sectional view illustrating the original Cragar wire-spoke wheel of FIG. 1. FIG. 2 illustrates several of the weaknesses in the prior art design, including narrow column 20, limited surface area 22 of the hub ends 131 of the spokes in the area between the hub 150 and the front cap 21, narrow rim width 24, aluminum 26, and narrow welding 28. FIG. 3 shows a front view illustrating a strengthened vintage Cragar-style wheel according to a preferred embodiment of the present invention. Wheel system 100 preferably comprises a strengthened vintage Cragar-style wheel 105. Preferably, strengthened vintage Cragar-style wheel 105 comprises rim 110, felly 120, outer spokes 130, inner spokes 140, wherein the outer spokes 130 comprises ten wire spokes and wherein the inner spokes 140 comprises twenty wire spokes, and hub 150, as shown.

Figure 5:
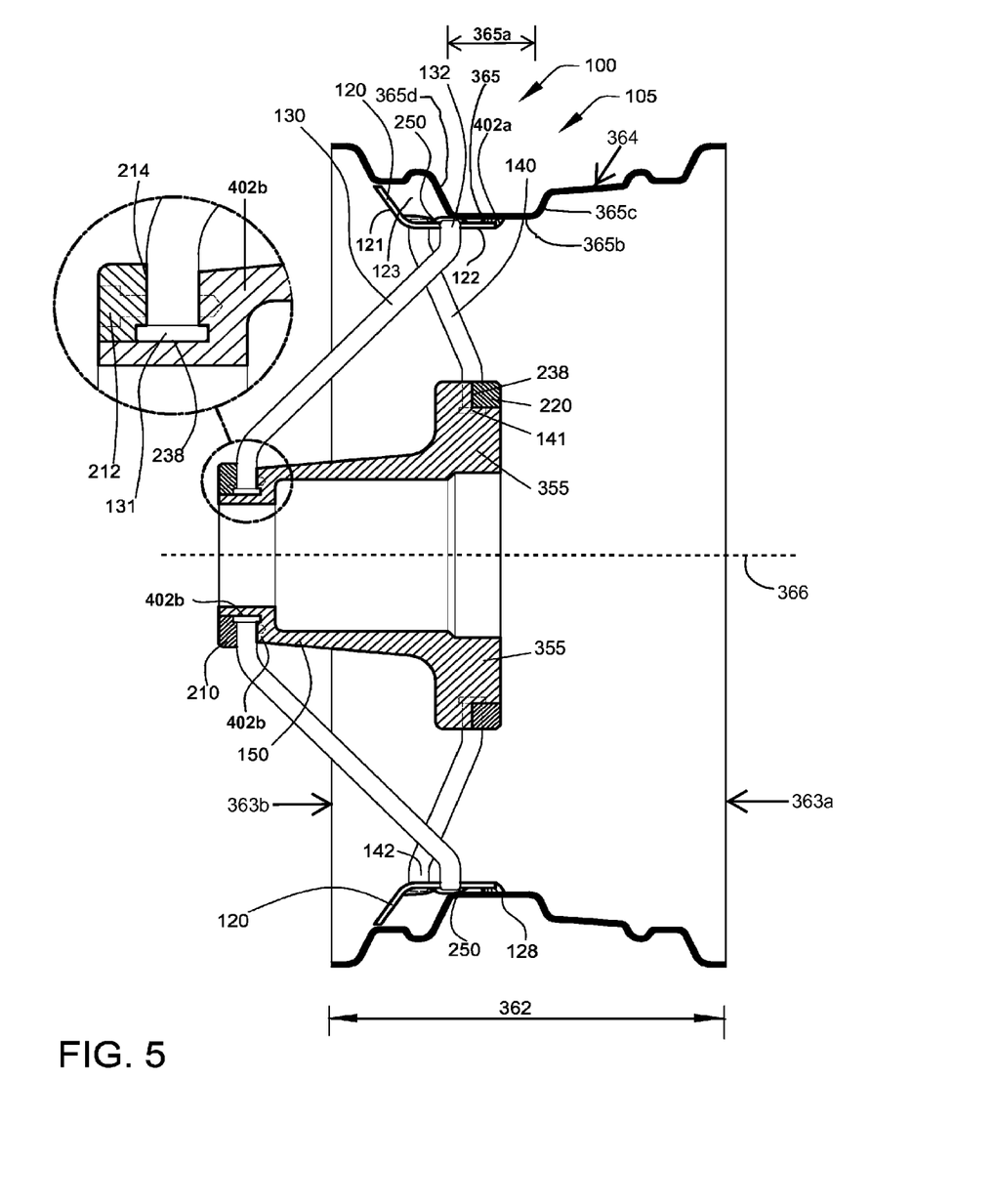
FIG. 5 shows a cross-sectional view illustrating the strengthened vintage Cragar-style wire-spoke wheel, according to the preferred embodiment of FIG. 3.

FIG. 5 shows a cross-sectional view illustrating the strengthened vintage Cragar-style wire-spoke wheel, according to the preferred embodiment of FIG. 3. Preferably, strengthened vintage Cragar-style wheel 105 comprises front cap 210, as shown. Preferably, strengthened vintage Cragar-style wheel 105 comprises rear cap 220, as shown. Preferably, front cap 210 comprises screws 212, which connect front cap 210 to hub 150, as shown. Preferably, rear cap 220 comprises screws 222, which connect rear cap 220 to hub 150, as shown. Preferably, hub-ends 131 of outer spokes 130 are clamped between hub 150 and front cap 210, as shown. Preferably, hub-ends 141 of inner spokes 140 are clamped between hub 150 and rear cap 220, as shown. Preferably, front cap 210 is secured with adhesive 238, preferably epoxy adhesive, as shown. Preferably, rear cap 220 is secured with adhesive 238, preferably epoxy adhesive, as shown. Upon reading the teachings of this specification, those with ordinary skill in the art will now understand that, under appropriate circumstances, considering issues such as cost, technology, user preference, etc., other hub-end spoke configurations, such as purely adhesive, purely welded, other combinations of welding and adhesives, other clamp configurations, other screw configurations, other fittings, other connectors, etc., may suffice.

Rim-ends 132 of outer spokes 130 preferably are fitted into the bores 250 comprising felly 120, as shown. Preferably, rim-ends 142 of inner spokes 140 are also fitted into the bores 250 comprising felly 120, as shown. Preferably, rim-ends 132 are welded into the bores 250 comprising felly 120, as shown. Preferably, rim-ends 142 are welded into the bores 250 comprising felly 120, as shown. Preferably, welding 128 comprises rim 110, as shown. Preferably, welding 128 comprises felly 120, as shown. Preferably, welding 128 is at least greater than three sixteenths of an inch wide, as shown. Preferably, welding 128 is along a full 360 degree circumference, as shown. Upon reading the teachings of this specification, those with ordinary skill in the art will now understand that, under appropriate circumstances, considering issues such as cost, technology, user preference, etc., other rim-end spoke configurations, such as purely adhesive, purely welded, other combinations of welding and adhesives, other clamp configurations, other screw configurations, other fittings, other connectors, etc., may suffice.

Strengthened vintage Cragar-style wheel 105 preferably is available in a variety of sizes to fit various cars. Preferably, strengthened vintage Cragar-style wheel 105 is available in rim diameters 360 from about thirteen inches to about twenty-six inches. Preferably, strengthened vintage Cragar-style wheel 105 is available in rim widths 362 ranging from about six inches to about twelve inches. Upon reading the teachings of this specification, those with ordinary skill in the art will now understand that, under appropriate circumstances, considering issues such as market demand, advances in technology, user preference, cost, etc., other sizes and dimensions, such as wide, narrower, taller, shorter, smaller, bigger, model car size, monster truck size, etc., may suffice.

Figure 4:
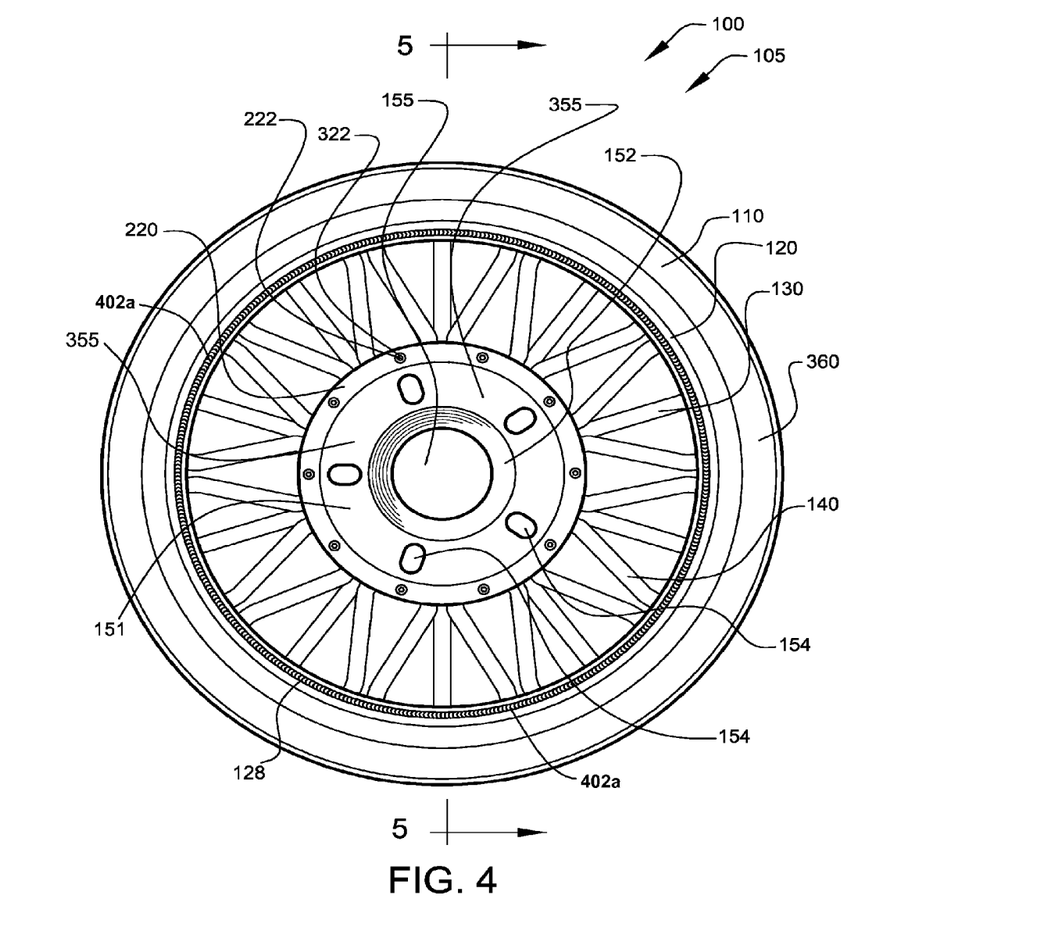
FIG. 4 shows a rear view illustrating the strengthened vintage Cragar-style wire-spoke wheel, according to the preferred embodiment of FIG. 3.

FIG. 4 shows a rear view illustrating strengthened vintage Cragar-style wheel 105. Preferably, hub 150 comprises flange 151 and column 152, as shown. Preferably, flange 151 is solid, except for aperture 155, lugholes 154, and screw-holes 322 for screws 222, as shown. Preferably, hub 150 comprises steel. Preferably, hub 150 comprises GB-20 steel. Preferably, hub 150 comprises GB-20 steel which is equivalent to ASTM-1020 or SAE-1020 steel. Hub 150 is preferably CNC machined. Preferably, hub 150 is CNC machined from a solid piece of steel. Preferably, hub 150 comprises a decorative central aperture. Preferably, the solid contour of back surface material 355, as shown, provides sufficient added strength to permit strengthened vintage Cragar-style wheel 105 to be manufactured with rim diameters 360 greater than fifteen inches. Upon reading the teachings of this specification, those with ordinary skill in the art will now understand that, under appropriate circumstances, considering issues such as cost, technology, user preference, etc., other manufacturing processes, such as machining a hub out of a material other than steel, machining all or most of a wheel using steel, machining all or most of a wheel from a material or materials other than steel, using composites, using plastics, using other machines, etc., may suffice.

Preferably, strengthened vintage Cragar-style wheel 105 comprises an about fifteen inch rim diameter 360. Preferably, strengthened vintage Cragar-style wheel 105 comprises an about seven inch rim width 362. Preferably, for rim diameters 360 of about twenty inches or greater, outer spokes 130 are thicker than the ones shown. Preferably, for rim diameters 360 of about twenty inches or greater, inner spokes 140 are thicker than the ones shown. Upon reading the teachings of this specification, those with ordinary skill in the art will now understand that, under appropriate circumstances, considering issues such as cost, technology, user preference, etc., other spoke configurations, such as thinner, thicker, doubled, tripled, other shapes, other dimensions, other materials, etc., may suffice.

In accordance with another preferred embodiment hereof, this invention provides a strengthened vintage Cragar-style wire-spoke wheel 105 wherein the first plurality of wire spokes comprises ten wire spokes and the second plurality of wire spokes comprises twenty wire spokes.

Strengthened vintage Cragar-style wheel 105 preferably comprises felly strengthener 402a. Preferably, felly strengthener 402a strengthens and reinforces portions of vintage Cragar-style wire-spoke wheel 105 which, in the past, were susceptible to mechanical failure and clacking (embodying herein means for strengthening the vintage spoke automotive wheel, having a Cragar-style appearance). Preferably, felly strengthener 402a comprises steel or adhesive, as shown.

As shown in FIG. 5, automobile rim 110 is structured and arranged to receive a tire (not shown), the rim having a center axis 366, a rear side 363a facing the automobile when attached to the automobile, a front side 363b opposite the rear side, a rim width 362 defined as the distance between the front and rear sides 363b, 363a along the axis and an outer circumferential surface 364 between front and rear sides 363b, 363a. Rim 110 rotates about center axis 366. Rim outer circumferential surface 364 further comprises a drop center section 365, annular in shape, having a substantially axially extending annular base section 365b of width 365a shown to be generally or substantially axially extending and substantially parallel to center axis 366 and generally axial flange section 122. Drop center section further comprises generally opposed, radial flanges 365c and 356d extending radially from opposed ends of the annular base section 365b to the rim outer circumferential surface 364. Drop center section 365 is located approximately in the center of rim width 362 along outer circumferential surface 364. Flange 151 preferably comprises approximately 7.9 cubic inches of material, preferably steel, by volume, in addition to the volume of material in the original Cragar wire-spoke wheel flange, such additional material 355 (also referred to herein as flange-hub strengthener 355) substantially reinforcing the five non-lughole cavities shown in FIG. 1 of the original Cragar wire-spoke wheel. Preferably, column-hub portion 700 extends axially outwardly past the front side of rim 110. Rim 110 preferably comprises steel. Preferably, felly 120 comprises steel. Preferably, outer spokes 130 comprise steel and/or chrome. Preferably, inner spokes 140 comprise steel with chrome plating. Felly 120 comprises a rear generally axial felly flange section 122 having an outward end and an inward end and being mounted at its inward-most end to rim 110. A radial front felly flange section 121 is disposed at the outward end of the axial flange section 122 and extends radially outwardly thereof, the outermost portion of the radial front felly flange section 121 not contacting the rim 110. Preferably, felly strengthener 402a comprises a thicker welding 128, which is thicker than the narrow welding 28 on the original Cragar wire-spoke wheel, such thicker welding 128 being greater than approximately three-sixteenths inches thick, as shown. Preferably, generally axial felly flange section 122 is mounted and welded to rim 110 with felly strengthener 402a comprising thicker welding 128 along a horizontal axis and parallel to drop center section 365 adjacent to rim-ends 132 of first plurality of wire spokes, wherein said welding is applied between said rear generally axial felly flange section 122 and said drop center section and positioned substantially concentrically inward of at least one side of rim 110 and wherein radial front felly flange section 121 outermost end is not mounted to rim 110 or drop center section 365, creating internal space 123 adjacent and substantially enclosed by radial front felly flange section 121, rim 110, and rim-ends 132, 142 of plurality of both first plurality of wire spokes and second plurality of wire spokes, wherein rim-ends 142 of second plurality of wire spokes 140 do not contact drop center section 365, as shown. Preferably, column-hub strengthener 402b comprises a wider column 152, which is wider than the original Cragar wire-spoke wheel narrow column 20, such wider column 152 being greater than approximately three and one-quarter inches in diameter, as shown. Preferably, flange-hub strengthener 355 is defined by flange-hub portion 705 comprising solid material portions between adjacent lugholes 154 of plurality of lugholes adapted to strengthen flange-hub portion 705. Preferably, a greater curved surface area portion 214 exists where the hub 150 and front cap 210 is in contact with the hub end 131, which is a greater curved surface area portion than limited surface area portion 22 on the original Cragar wire-spoke wheel, such that inner surface of front cap 210 contacts with outer spoke 130 to form curved surface area portion 214, where hub 150 is in contact with hub end 131 is greater than 0.06 inches squared, as shown. The additional strength afforded by the combination of felly strengthener 402a, column-hub strengthener 402b, flange-hub strengthener 355, and greater curved surface area portion 214 in the above described system permits increased strength and wider rim configurations in as much as the system has the capacity to resist increased torque forces transferred from a wider rim to the corresponding felly, spokes, and hub.

Figure 6:
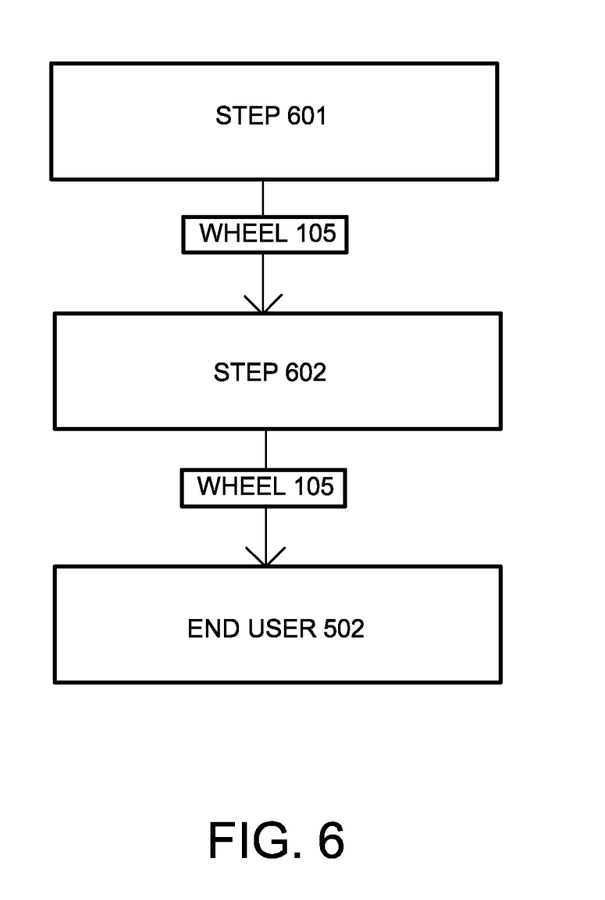
FIG. 6 is a diagram illustrating a method according to a preferred embodiment of the present invention.

FIG. 6 illustrates a method of providing at least one vintage wire-spoke automotive wheel 504, which is safer than an the original Cragar wire-spoke wheel, to at least one end user 502, comprising the steps of: (1) providing improved strength to the at least one vintage spoke automotive wheel (step 601); and (2) providing an appearance substantially similar to the original Cragar wire-spoke wheels to at least one vintage spoke automotive wheel (step 602).

Figure 7:
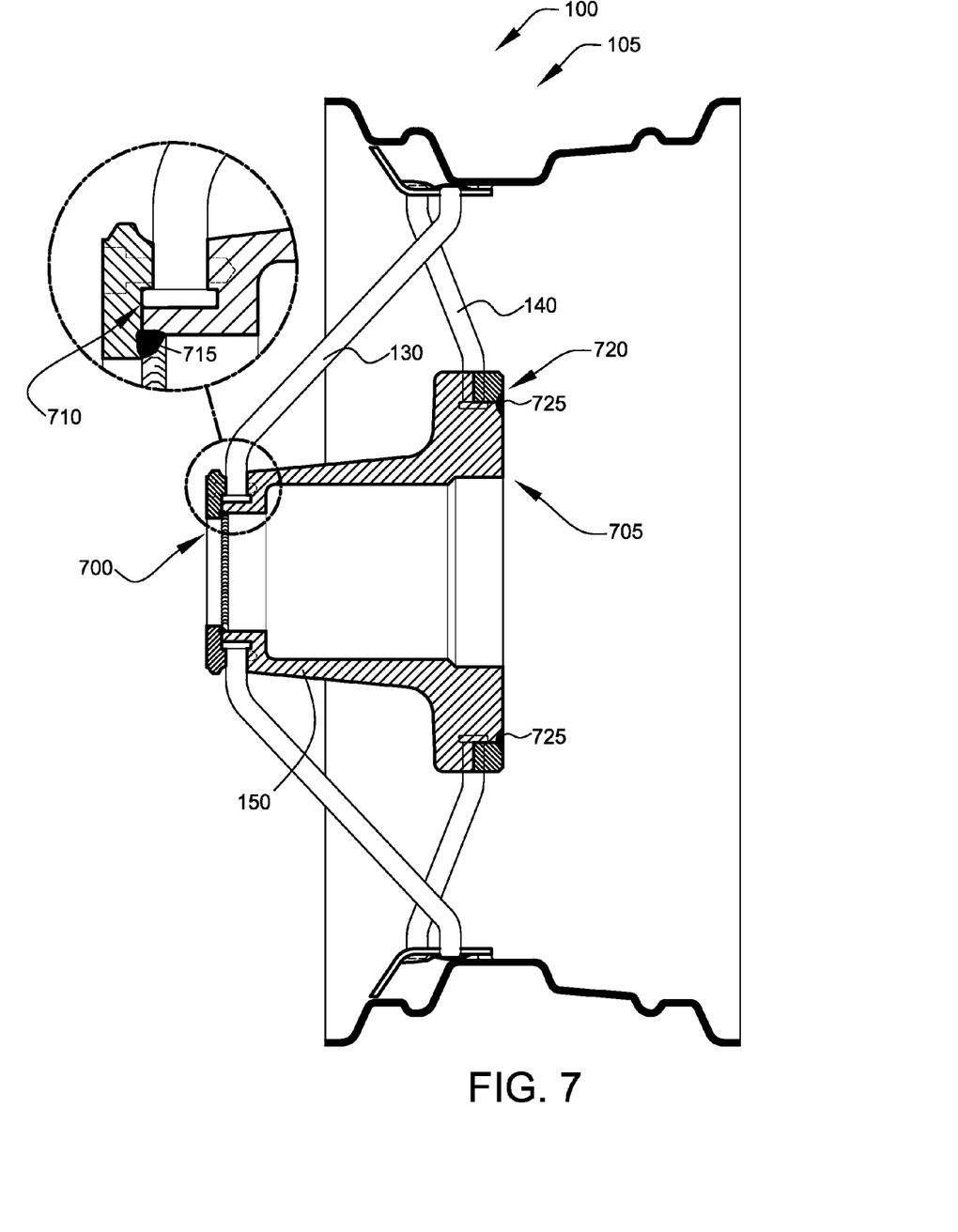
FIG. 7 shows a cross-sectional view illustrating a strengthened vintage Cragar-style wire spoke wheel, according to another preferred embodiment of the present invention.

FIG. 7 shows a cross-sectional view illustrating a strengthened vintage Cragar-style wire spoke wheel, according to another preferred embodiment of the present invention. The wheel illustrated in FIG. 7 is substantially similar to the wheel in FIG. 5, as shown. The alternate preferred embodiment shown in FIG. 7 illustrates additional strengthening applied to wheel 105. Hub 150 preferably comprises column-hub portion 700 and flange-hub portion 705, as shown. Preferably, column-hub portion 700 extends axially outwardly past the front side of rim 110. Preferably, column-hub portion 700 comprises a diameter to decrease the unsupported length of column-hub end of first plurality of wire spokes and column-hub retainer 710 comprises a curved surface area portion 214, structured and arranged to contact column-hub end of first plurality of wire spokes, to decease the unsupported length of said column-hub end of each of first plurality of wire spokes. Preferably, the column-hub end of outer spokes 130 are retained by column-hub retainer 710 of column-hub portion 700, as shown. Preferably, thermal weld strengthener 715 is applied to the area around column-hub retainer 710, as shown. Preferably, such applied thermal weld strengthener is a continuous thermal weld between the column-hub retainer 710 of column-hub portion 700, as shown. Preferably, thermal weld strengthener 715 is a about a ¼ inch wide weld using a compatible thermal welding process. Thermal weld strengthener 715 adds strength to strengthen the retention of the column-hub ends of outer spokes 130 to the column-hub retainer 710. Also preferably, the flange-end of inner spokes 140, are retained by flange-end retainer 720 of flange-hub portion 705, as shown. Preferably, thermal weld strengthener 725 is applied to the area around flange-end retainer 720, as shown. Preferably, ten thermal welds (of thermal weld strengthener 725) having a length of about 1 inch and a width of about ¼ inch are equally spaced about the circumference of the flange-end retainer 720. Thermal weld strengthener 725 adds strength to strengthen the retention of the flange-end of inner spokes 140 to flange-end retainer 720, as shown. The above-preferred thermal weld strengtheners 715, 725 assist in strengthening wheel 105 for added safety as well as solving other problems disclosed herein. The additional strength afforded by the combination of felly strengthener 402a, column-hub strengthener 402b, flange-hub strengthener 355e, greater curved surface area portion 214, and thermal weld strengtheners 715, 725 in the above described system permits increased strength and wider rim configurations in as much as the system has the capacity to resist increased torque forces transferred from a wider rim to the corresponding felly, spokes, and hub.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

I claim:

1. An automotive wheel system, relating to strengthening automotive wheels comprising wire spokes, such automotive wheels attachable to at least one automobile, said automotive wheel system comprising:

a) a rim structured and arranged to receive a tire, said rim having a center axis, a rear side facing said automobile when attached to said automobile, a front side opposite said rear side, a rim width defined as the distance between said front and rear sides along said axis, an outer circumferential surface between said rear and said front sides, and a drop center section, annular in shape, having a substantially axially extending annular base section that is substantially axially extending and substantially parallel to said axis and located approximately in the center of said rim width along said outer circumferential surface, said drop center section further comprising generally opposed, radial flanges extending radially from opposed ends of said annular base section to said outer circumferential surface;

b) a hub comprising a column-hub portion and a flange-hub portion c) a first plurality of wire spokes, each wire spoke comprising a rim-end and a column-hub end; and d) a second plurality of wire spokes, each wire spoke comprising a rim-end and a flange-hub end;

e) wherein said column-hub portion is structured and arranged to support said column-hub end of said first plurality of wire spokes;

f) wherein said flange-hub portion is structured and arranged to support said flange-hub end of said second plurality of wire spokes; and g) wherein said column-hub portion extends axially outwardly past said front side of said rim;

h) a felly comprising a rear generally axial felly flange section having a front end and a rear end, with bores structured and arranged to support said rim-ends of said plurality of both said first plurality of wire spokes and said second plurality of wire spokes and a radial front felly flange section disposed at the front end of the axial flange section and extending radially outwardly to an outermost end thereof;

i) wherein said rear generally axial felly flange section is mounted and welded at its inward-most end to said drop center section of said rim with a felly strengthener comprising a welding along said drop center section adjacent to said rim-ends of said first plurality of wire spokes, wherein said welding is applied between said rear generally axial felly flange section and said drop center section and positioned substantially concentrically inward of at least one side of said rim and wherein said radial front felly flange section outermost end is not mounted to said rim nor to said drop center section, creating an internal space adjacent and substantially enclosed by said radial front felly flange section, said rim, and said rim-ends of said plurality of both said first plurality of wire spokes and said second plurality of wire spokes, wherein said rim-ends of said second plurality of wire spokes do not contact said drop center section;

j) wherein said column-hub portion of said hub is positioned concentrically inward of said felly; and k) wherein said flange-hub portion comprises a plurality of lugholes structured and arranged to assist attachment of said automotive wheel system to at least one automobile;

l) a column-hub retainer structured and arranged to retain said column-hub ends of said first plurality of wire spokes to said column-hub portion;

m) wherein said column-hub retainer comprises a plurality of apertures each structured and arranged to receive a fastener, such fastener adapted to secure said first plurality of wire spokes to said column-hub portion;

n) a flange-hub retainer structured and arranged to retain said flange-hub ends of said second plurality of spokes to said flange-hub portion;

o) wherein said flange-hub retainer comprises a plurality of apertures each structured and arranged to receive a fastener, such fastener adapted to secure said second plurality of wire spokes to said flange-hub portion; and p) at least one column-hub strengthener comprising i) said column-hub portion comprising a diameter to decrease the unsupported length of said column-hub end of each of said first plurality of wire spokes, and ii) said column-hub retainer comprising a curved surface area, structured and arranged to contact said column-hub end of said first plurality of wire spokes, to decrease the unsupported length of said column-hub end of each of said first plurality of wire spokes;

q) at least one flange-hub strengthener defined by said flange-hub portion comprising solid material portions between adjacent lugholes of said plurality of lugholes adapted to strengthen said flange-hub portions; and r) wherein said automotive wheel system is strengthened by a combination of said felly strengthener, said at least one column-hub strengthener, said curved surface area, and said at least one flange-hub strengthener.

2. The system, according to claim 1, wherein said hub, said rim, said felly, said flange-hub retainer, and said column-hub retainer each comprise a substantially ferrous material.

3. The system according to claim 1, wherein said felly is welded to said rim with a continuous weld having a width greater than about three sixteenths of an inch.

4. The system, according to claim 1, wherein said column-hub end of said first plurality of wire spokes and said flange-hub end of said second plurality of wire spokes are secured to said hub at least with adhesive.

5. The system according to claim 4, wherein said adhesive comprises at least one epoxy adhesive.

6. The system according to claim 1, wherein the diameter of said column-hub portion comprising a diameter to decrease the unsupported length of said column-hub end of each of said first plurality of wire spokes is greater than about three and one-quarter inch.

7. The system according to claim 6, wherein the curved surface area of said column-hub retainer structured and arranged to contact said column-hub end of said first plurality of wire spokes to decrease the unsupported length of said column-hub end of each of said first plurality of wire spokes comprises an area greater than about 0.06 inches squared.

8. The system according to claim 7,
a) wherein said rim comprises a width dimension of at least seven inches.

9. The system according to claim 1 wherein said first plurality of wire spokes comprises ten wire spokes and wherein said second plurality of wire spokes comprises twenty wire spokes.

10. An automotive wheel system, relating to a wire-spoke automotive wheel attachable to at least one automobile, said wheel system comprising:

a) a rim structured and arranged to receive a tire, said rim having a center axis, a rear side facing said automobile when attached to said automobile, a front side opposite said rear side, a rim width defined as the distance between said front and rear sides along said axis, an outer circumferential surface between said rear and said front sides, and a drop center section, annular in shape, having a substantially axially extending annular base section that is substantially axially extending and substantially parallel to said axis and located approximately in the center of said rim width along said outer circumferential surface, said drop center section further comprising generally opposed, radial flanges extending radially from opposed ends of said annular base section to said outer circumferential surface;

b) a hub comprising a column-hub portion and a flange-hub portion;

c) a first plurality of wire spokes, each wire spoke comprising a rim-end and a column-hub end; and d) a second plurality of wire spokes, each wire spoke comprising a rim-end and a flange-hub end;

e) wherein said column-hub portion is structured and arranged to support said column-hub end of said first plurality of wire spokes;

f) wherein said flange-hub portion is structured and arranged to support said flange-hub end of said second plurality of wire spokes;
g) wherein said column-hub portion extends axially outwardly past said front side of said rim;
h) a felly comprising a rear generally axial felly flange section having an outward end and an inward end, with bores structured and arranged to support said rim-ends of said plurality of both said first plurality of wire spokes and said second plurality of wire spokes and a radial front felly flange section disposed at the outward end of the axial flange section and extending radially outwardly to an outermost end thereof;
i) wherein said rear generally axial felly flange section is mounted and welded at its inward-most end to said drop center section of said rim with a felly strengthener comprising a welding along said drop center section adjacent to said rim-ends of said first plurality of wire spokes, wherein said welding is applied between said rear generally axial felly flange section and said drop center section and positioned substantially concentrically inward of at least one side of said rim and wherein said radial front felly flange section outermost end is not mounted to said rim nor to said drop center section, creating an internal space adjacent and substantially enclosed by said radial front felly flange section, said rim, and said rim-ends of said plurality of both said first plurality of wire spokes and said second plurality of wire spokes, wherein said rim-ends of said second plurality of wire spokes do not contact said drop center section;
j) wherein said column-hub portion of said hub is positioned concentrically inward of said felly; and
k) wherein said flange-hub portion comprises a plurality of lugholes structured and arranged to assist attachment of said automotive wheel system to at least one automobile;
l) a column-hub retainer structured and arranged to retain said column-hub ends of said first plurality of wire spokes to said column-hub portion;
m) wherein said column-hub retainer comprises a plurality of apertures each structured and arranged to receive a fastener, such fastener adapted to secure said first plurality of spokes to said column-hub portion; and
n) a flange-hub retainer structured and arranged to retain said flange-hub ends of said second plurality of spokes to said flange-hub portion;
o) wherein said flange-hub retainer comprises a plurality of apertures each structured and arranged to receive a fastener, such fastener adapted to secure said second plurality of wire spokes to said flange-hub portion;
p) at least one flange-hub strengthener defined by said flange-hub portion comprising solid material portions between adjacent lugholes of said plurality of lugholes to strengthen said flange-hub portion;
q) at least one column-hub strengthener defined by the diameter of said column-hub portion comprising a diameter to decrease the unsupported length of said column-hub end of each of said first plurality of wire spokes, and a curved surface area, structured and arranged to contact said column-hub end of said first plurality of wire spokes, to decrease the unsupported length of said column-hub end of each of said first plurality of wire spokes;
r) at least one thermal weld strengthener comprising
 i) a continuous weld applied at the junction of said column-hub retainer and said column hub portion and
 ii) a continuous weld applied to the junction of said flange-hub retainer and said flange-hub portion; and
s) wherein said automotive wheel system is strengthened through a combination of said felly strengthener, said at least one column-hub strengthener, said curved surface area, said at least one flange-hub strengthener, and said at least one thermal weld strengthener.

11. The system according to claim 10, wherein said felly is welded to said drop center section of said rim with a continuous weld having a width greater than about three sixteenths of an inch.

12. The system according to claim 11, wherein the diameter of said column-hub portion comprising a diameter to decrease the unsupported length of said column-hub end of each of said first plurality of wire spokes is greater than about three and one-quarter inches.

13. The system according to claim 12 wherein said column-hub end of said first plurality of wire spokes and said flange-hub end of said second plurality of wire spokes are secured to said hub at least with adhesive.

14. The system according to claim 13, wherein said adhesive comprises at least one epoxy adhesive.

15. The system according to claim 14 wherein said rim comprises a width dimension of at least about seven inches.

16. The system according to claim 10 wherein said first plurality of wire spokes comprises ten wire spokes and wherein said second plurality of wire spokes comprises twenty wire spokes.

\* \* \* \* \*